Patented Apr. 19, 1932

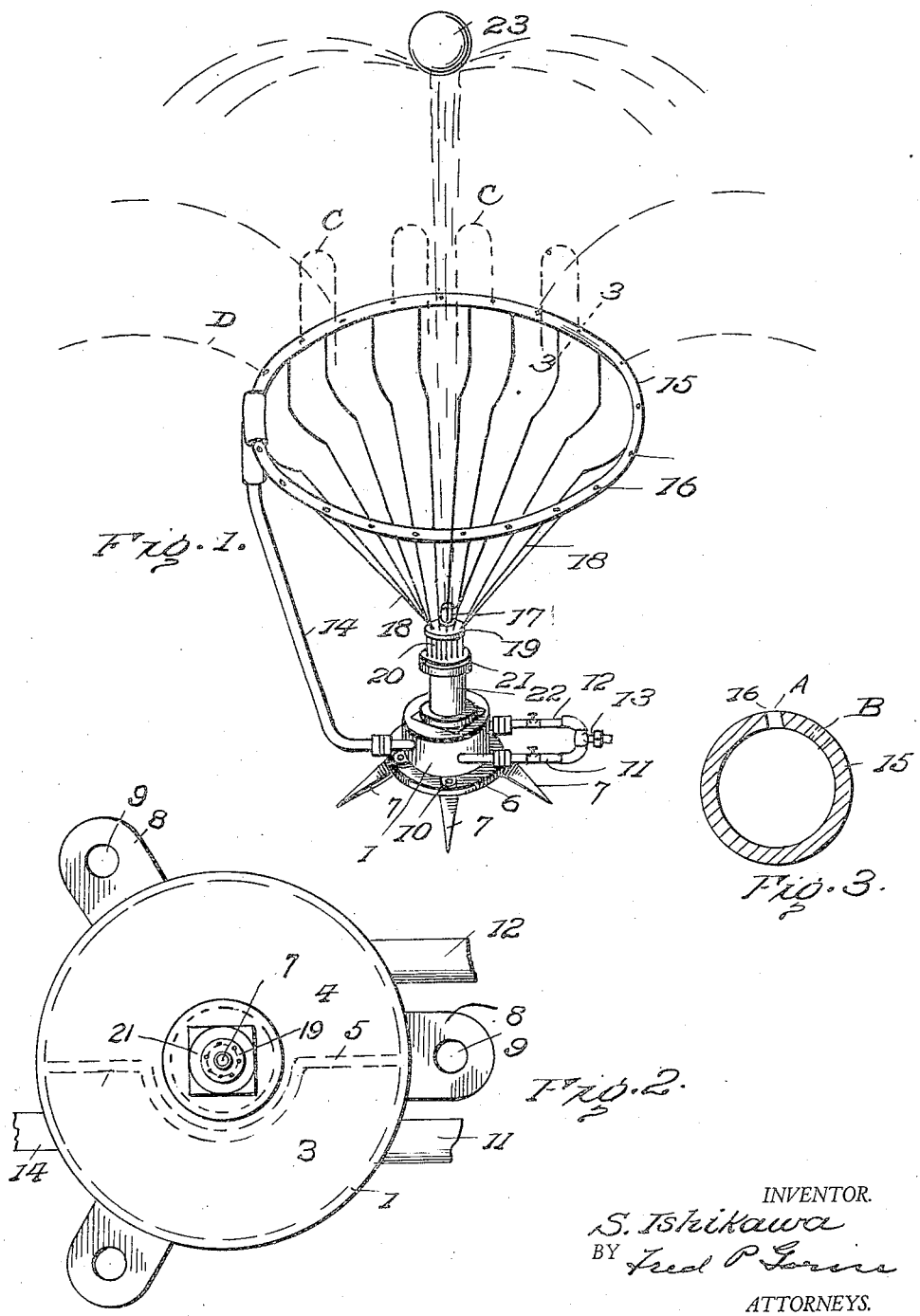

1,854,613

UNITED STATES PATENT OFFICE

SADATOSHI ISHIKAWA, OF SEATTLE, WASHINGTON

SPRAYING DEVICE

Application filed September 29, 1931. Serial No. 565,870.

This invention relates to improvements in spraying devices, and more particularly to sprayers of the type used upon lawns, gardens, and the like.

An object of the invention is to provide an attractive structure, and one which will effectively distribute the water on the lawn or flower bed.

A further object of the invention is to provide a sprayer which has a fountain appearance, and a structure which is inexpensive to manufacture and durable and which is novel.

A still further object of the invention is the provision of a sprayer which will not be uniform in its spraying but one which will distribute water merely by chance.

A still further object of the invention is the provision of a free ball adapted to deflect the water as its leaves the nozzle, and means for retaining the ball in operative relation.

In the drawings:

Fig. 1 is a perspective view of the sprayer.

Fig. 2 is a top plan view of the water container.

Fig. 3 is a section taken on the line 3—3 of Fig. 1.

Referring now more particularly to the drawings, 1 indicates a water container. The container is divided into subchambers 3 and 4 by means of a partition 5, curved about its center, as shown. A base 6 is supported by legs 7 pointed as shown, so as to more readily penetrate a short distance in the turf and hold the sprayer in position. The water container 1 is secured to the base by means of lugs 8 perforated as at 9 to receive bolts or screws 10. An intake pipe 11 communicates with subchamber 3. A similar pipe 12 communicates with the other subchamber 4. A pipe 13 leads to a water supply under suitable head, such as the usual water supply of cities and towns, and communicates with both the pipes 11 and 12. Leading upwardly from the water container 1 is another pipe 14, which communicates with a circularly arranged pipe 15 having small apertures 16. 17 is a central upstanding pipe which leads upwardly from the water container 1, and is open at its upper end. The pipe 15 is supported by a number of ornamental wires 18, extending upwardly from a plate 19, which is connected by a number of wires 20 to a plate 21, which in turn is secured to a bushing 22, which surrounds the central pipe 17. The perforations 16 in the circular pipe 15 are not all arranged in the same order. For example, some of the holes are cut rather slantwise, but in the top surface of the pipe 15, other holes are cut through on a true radius of the pipe, as at B. From this arrangement, the water, when it is turned on through the supply pipe 13 and pipes 11 and 12, will forcefully emerge from the pipe 15 at different angles. 23 is a hollow ball, preferably of light material, such as celluloid or the like, which normally rests in its dotted position, as seen in Fig. 1. When the water is turned on, a jet, such as indicated in Fig. 1, results, which carries the ball into its full line position; the water at the same time passing out through the apertures 16, as just indicated.

It is obvious that the sprayer can be moved from place to place and remain in a stable position on account of the pointed shape of the feet 7, and that the water is sprayed or distributed over a considerable radius. The course of the water, as it emerges from the holes A, is indicated by dotted lines C in Fig. 1. The course of the water as it emerges from the holes B is indicated in dotted lines D.

While I have shown and described a particular form of embodiment of my invention, I am aware that many minor changes will readily suggest themselves to those skilled in the art without departing from the spirit and scope of my invention. I therefore desire to avoid being limited to the particular form of embodiment which I have hereinabove shown.

Having described my invention, what I claim as new is:

1. A sprayer, comprising a water container, having a partition to form two water passages, feed water pipes connecting the water passages to a source of supply, a vertically disposed pipe extending from and communicating with one of the water passages, an annular perforated pipe horizontally mounted above and spaced from the vertically disposed pipe by means of a pipe communicating with the other of the water passages and the annular perforated pipe, and valves for controlling the feed water pipes.

2. A sprayer, comprising a water container, having a partition to form two water passages, feed water pipes communicating with the passages, a hollow standard extending from the water container, a vertically disposed pipe communicating with one of the passages and extending above the hollow standard, an annular horizontal pipe above and spaced from the vertical pipe, said annular pipe having two sets of perforations angularly disposed to throw streams of water outwardly and vertically, supports extending from the standard to the annular pipe, and a pipe communicating with the other of the passages and the annular pipe.

3. A sprayer, comprising a base provided with sharpened inclined legs, a water container supported on the base, a hollow standard rising from the base and extending through the top of the water container, a transverse partition in the water container, said partition having a bowed portion extending around the standard, said partition forming two passages, feed water pipes communicating with said passages, a vertically disposed pipe extending from one of the passages in the water container and through the hollow standard, a series of supports extending upwardly and outwardly from the top of the standard, an annular horizontal perforated pipe supported on the upper ends of the supports, and a pipe communicating with the other of the passages and the annular perforated pipe.

In testimony whereof I affix my signature.

SADATOSHI ISHIKAWA.